United States Patent

[11] 3,572,619

| [72] | Inventor | Edward G. Brown |
| | | R.R. 2, Eaton, Ohio 45320 |
| [21] | Appl. No. | 792,939 |
| [22] | Filed | Jan. 22, 1969 |
| [45] | Patented | Mar. 30, 1971 |

[54] AIRPORT AND RUNWAY SYSTEM THEREFOR
7 Claims, 5 Drawing Figs.

| [52] | U.S. Cl. | 244/114 |
| [51] | Int. Cl. | B64f 1/00, |
| | | B64f 1/36 |
| [50] | Field of Search | 244/114 |

[56] References Cited
UNITED STATES PATENTS

| 1,850,490 | 3/1932 | Bahl | 244/114 |
| 2,400,841 | 5/1946 | Rogers | 244/114 |
| 2,765,994 | 10/1956 | Jordanoff | 244/116 |

OTHER REFERENCES
AVIATION AGE. December, 1953. Pages 32—33
FLIGHT. October 21, 1943. Page 454

*Primary Examiner*—Milton Buchler
*Assistant Examiner*—Paul E. Sauberer
*Attorney*—Marechal, Biebel, French & Bugg ABSTRACT: Airports are disclosed which have runways laid out so that they do not intersect. The runways are formed in centerline-aligned pairs, and have adjacent ends which are spaced apart so that when one of the runways of the pair is used for incoming or landing traffic the other runway may be used for departure traffic. The adjacent ends only of the runways are provided with short taxiways leading to a terminal ramp area. The landing aircraft proceeds to the end of its runway onto the taxiway and into the ramp area, and the departing aircraft proceeds by way of the taxiway to the adjacent end of a departure runway. The taxi distances both inbound and outbound are related only to the adjacent end of one runway. Since there is no need to taxi to the far end of a runway, there is less delay both in the air and on the ground. There is no intermix of landing and departing aircraft on a single runway.

Patented March 30, 1971

LANDING DIRECTION

TAKE OFF DIRECTION

WIND

INVENTOR
EDWARD G. BROWN
BY
Marechal, Biebel, French & Bugg
ATTORNEYS

Patented March 30, 1971

AIRPORT AND RUNWAY SYSTEM THEREFOR

BACKGROUND OF THE INVENTION

The problem of air traffic control has reached crises proportions by reason of traffic congestion due to the necessity for handling a large number of incoming and outgoing aircraft while maintaining at least the minimum separation standards under instrument conditions. The crisis is due directly to the unavailability of runways for all inbound aircraft who wish to land at a given time. In general, the delays encountered in the air traffic control system are arrival delays, resulting in the necessity for stacking aircraft in holding patterns at fixes around and adjacent to the perimeter of the destination airport. In the absence of a fully computerized air traffic control system there is no effective way to delay departures or otherwise to regulate departures at remote locations in order to schedule arrivals commensurate with the saturation capacity of the airport runways. All arrival delays are generally due to the fact that only one aircraft can land on a given runway at one time. The controller must maintain minimum separation standards between arrival aircraft and move them out of the holding stack and vector them onto an approach to the runway. At the same time, it is often necessary to utilize the same or an intersecting runway for departing aircraft, and the tower operator must work in the departures between the landing aircraft.

The lack of adequate landing runway facilities has resulted in overburdening the entire system, in many locations about the country. As a result, a larger number of aircraft are required to remain aloft for a longer time until they can be given a landing sequence. Therefore, more sophisticated radar equipment is required to handle the aircraft aloft and a larger number of controllers are required to control the movement of the increased traffic, much of which is either holding or being vectored to an alternate airport, all because of the fact that the landing facility is saturated.

Existing airports commonly have crossing runways, crossing taxiways and taxiways which cross runways. This is generally true of airports which have parallel runways. At any one time and under any given prevailing wind conditions, such crossing runways such as at Washington National Airport in Washington, D.C. and parallel runways such as at Chicago O'Hare Airport are used simultaneously for landings as well as for takeoffs. With such airport systems, a parallel taxiway normally extends the full length of the runway so that aircraft can taxi to either end of the runway for departure accordingly to the prevailing wind conditions. For the same reasons, each end of the runway usually is provided with runup ramps on which aircraft may temporarily park and go through checkout procedures, and await their turn for takeoff. With jet aircraft and the populous regions adjacent the runway ends, it has been necessary to erect blast fences to deflect the exhaust gases and noises from the jet engines, for the well being and safety of those adjacent the runway ends.

As is sometimes the case with long jet runways in the order of 10,000 feet, it may be necessary for an aircraft to taxi almost 2 miles to reach the takeoff end of such a runway. Similarly, when the prevailing wind is from the opposite direction, a landing aircraft may be required to taxi about the same distance back to the terminal. Crossing runways and intersecting taxiways present a real hazard to aircraft and occupants, and present special control problems for the tower operators. At the very least the intersecting taxiways and runways provide an inconvenience, and often result in pilot confusion, especially at night.

SUMMARY OF THE INVENTION

The present invention provides airport systems using a diverse arrangement of runways in which there are at least two runways in generally centerline alignment, longitudinally spaced from each other, with taxiways being provided from the adjacent end of the runway to the terminal or ramp area, but with no taxiways provided to the far or remote ends of the runway. With again prevailing wind direction, aircraft will land into the wind on the runway extending toward the terminal or ramp area. Such landed aircraft will proceed to the end of the runway and onto a relatively short taxiway directly to the terminal area. Departing aircraft will be directed to the near end of the other runway which will become the departure runway, by a correspondingly short taxiway. The system permits simultaneous takeoff and landings from each of the centerline aligned pairs of runways.

In other embodiments of the invention a plurality of pairs of such runways provide mixing of both high and low-speed aircraft and provide both instrument and VFR runways. In one embodiment, the runway pairs are aligned at an angle to each other, and are each offset laterally from the terminal area and are connected to the terminal area only at their inner adjacent ends by relatively short taxiways.

In the runway system of this invention, there is no need for parallel taxiways, thus permitting maximum use of the runway material, and eliminating the necessity for runups, and a runup pad, blast fences, noise abatement procedures and the like at the far ends of any of the runways. All taxi distances both inbound and outbound remain at a minimum thereby resulting in less delay and less fuel consumption. Fuel consumption on a jet aircraft is often a major consideration where an extended ground hold or an extended taxi operation is required.

Since the runways of the present system are arranged in pairs of runways which are in general centerline alignment, common electronic navigation and landing aids may be provided for each of the runway pairs in the space between the adjacent ends of the runways. For example, a common localizer system may be employed to create a front course of one of the runways and a back course on the other of the runways, and the antenna structure may be positioned in the space between the adjacent ends of the runways.

Since there are no crossing runways and no crossing taxiways, maximum utilization may be made of the landing systems. With any prevailing wind condition, half of the runways of the airport constructed according to my invention may be utilized solely for landings. Therefore, these runways may be utilized to maximum saturation without regard to delays due to takeoffs on the same runway surface or due to crossing or intersecting aircraft on that surface. Since the aircraft will proceed to the end of the runway and turn off on the high speed turnoffs onto the relatively short taxiways leading to the terminal areas, no delays will be encountered due to aircraft stopping on the runway in order to taxi back to the terminal or to find a suitable exit taxiway or access. In order to facilitate the movement of landed aircraft from the active runway surface, a series of displaced thresholds may be provided to indicate landing zones of less than the full runway length for use by aircraft which do not require the full length of the runway.

All takeoffs will be accomplished at the near or adjacent ends of the outbound or departure runways, with any given prevailing wind condition. Under ordinary conditions, no runups or takeoffs will be accomplished at the remote end of any of the runways. Thus, the problems of noise abatement and air pollution at the remote runway ends is substantially reduced. Accordingly, the runways may be extended into the countryside and, like a super highway, blend and become a permanent part of the landscape.

An important advantage of this invention is that it lends itself readily to the conversion of existing airports and thereby substantially increase the capacity for landing and takeoff movements as well as the safety at such airports, with a minimum of expense and with a maximum utilization of existing facilities. Since takeoffs will always be in one direction on any given runway and landings will always be in the opposite direction, each runway will have only one approach end. The runway lighting facilities may be optimized for this condition, that is, for landings in one direction only and for takeoffs in the opposite direction only. The missed approach procedures for aircraft are simplified and the hazards to other aircraft in the vicinity are reduced. The dual centerline aligned features of the runways permit a further area on which an aircraft in trouble may be able to land for he may use the companion or centerline aligned upwind runway in the event of an emergency such as the loss of an engine on takeoff, or the like. Similarly, the air traffic control handling of aircraft from outlying peripheral fixes to the approach ends of the landing runways of the present system may be simplified and, similarly, the handling and vectoring of departure aircraft may be simplified, due to the displacement of the runways.

These and other objects and advantages of the present invention will become apparent from the following description, the accompanying drawings and the appended claims.

DESCRIPTION OF PREFERRED EMBODIMENTS

In the following description, the standardized FAA runway designation numerals may be employed when referring to airport runways, by referring to the magnetic heading of the runway rounded off to the nearest 10° of magnetic direction. Thus, in this standardized and well-known system, a runway extending directly to magnetic north-south would be identified as runway "18—36," and a runway directed to magnetic east-west would be identified as runway "9—27." It is further understood that suitable instrument approach light systems, runway and taxiway lighting systems, and runway surface markings such as instrument runway marking systems, threshold markings and the like, all of which have been standardized and established by the FAA, may be incorporated, but for the purpose of clarity and presenting the basic concepts of the present invention, such approach lighting systems and surface markings have been omitted from the description.

Figure 1:
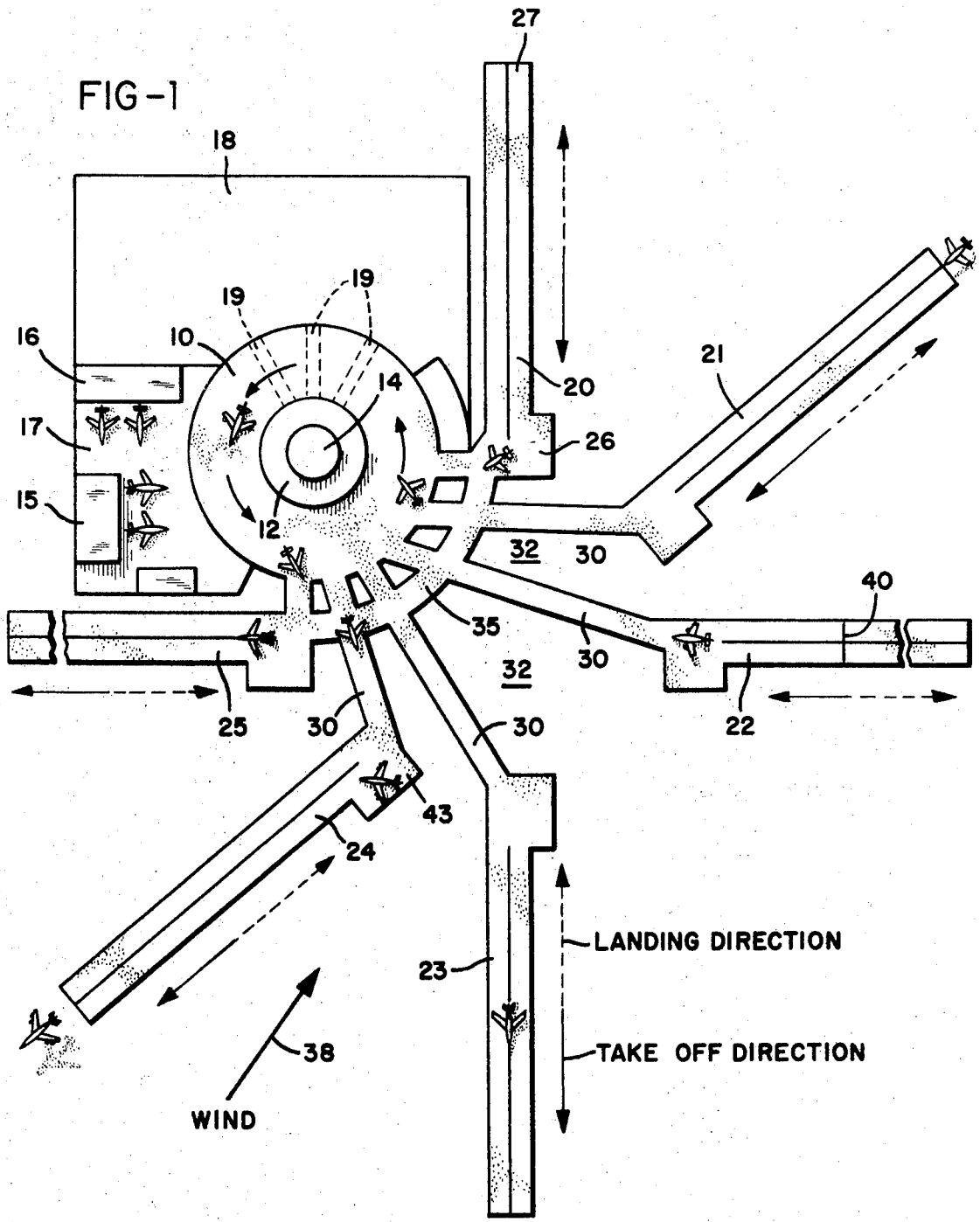
FIG. 1 is a plan diagram of an airport construction according to my invention.

In FIG. 1, a terminal ramp area is illustrated generally at 10 as being circular in configuration providing for either clockwise or counterclockwise movement of aircraft. A counterclockwise arrangement is shown. The ramp area 10 thus surrounds a central terminal building 12 which has the usual control tower 14 mounted on top for local observations and control of aircraft entering into and departing from the airport traffic area. As presently established, the airport traffic area comprises the air space within a radius of 5 nautical miles and extending up to but not including 2,000 feet above ground level. Adjacent to the terminal 12 there may be provided hangar facilities and other buildings generally indicated at 15 and 16 in FIG. 1 with a ramp 17 which together may comprise the "general aviation" area of the airport.

Parking may be provided in the area indicated at 18 and suitable underground ramps 19 may lead from the parking area 18 to the terminal 12. If desired, one or more such ramps 19 may provide for automotive and limousine traffic onto a circular concourse underlying or otherwise forming a part of, or associated with, the terminal 12 for the purpose of depositing and picking up passengers.

The ramp area 10 is uniquely associated with a plurality of individual runways, and the runways themselves are specially arranged with respect to each other to provide a system which is adapted for high density and safe operation. To this end, there are provided a plurality of individual runways 20, 21, 22, 23, 24 and 25 as shown in FIG. 1. The runways are each formed with ramp adjacent ends 26 and remote ends 27, as illustrated with respect to the runway 20. The ramp adjacent ends 26 are each connected to the ramp area 10 by means of short taxiways 30, which preferably are constructed taking into account permissible side loadings on aircraft landing gears, surface conditions, and other factors permitting relatively high speed turnoff from the active runway onto the associated taxiway.

As will be seen by an examination of FIG. 1, the individual runways define pairs of centerline aligned runways. The runway pairs in this embodiment comprise runways 20—23, 21—24, and 22—25. It will be seen that the runways, making up one of the runway pairs, has their adjacent end 26 positioned in spaced relation, thus defining an open space 32 therebetween within which suitable navigational equipment, antenna systems and the like may be positioned in common with one or more of the runway pairs. For example, a localizer antenna may be positioned generally in the area identified by the reference numeral 32 to provide a front course localizer for runway 20 and, at the same time, provide a back course for runway 23. Also, a VOR, low frequency beacon, and other navigational aids may suitably be located within the area 32.

A further examination of the runway system of FIG. 1 shows that all of the runways are in nonintersecting relation with any other runway or taxiway. In this embodiment, the runways radiate from the region 32 generally like spokes of a wheel, in oppositely aligned pairs, the center of which is laterally offset from the ramp area 10. While a ramp area 10 is formed in common with the adjacent ends of the taxiways 30, an outer belt type of taxiways 35 may be provided to permit crossflow of traffic and greater flexibility in the handling of aircraft on the ground. Thus, the taxiways 35 provide inbound traffic a region for short holds if terminal traffic warrants while outbound traffic can be routed to outbound runways after leaving the immediate area of the terminal. Also, the taxiways provide an access to the general aviation ramp along a route without having to cross the terminal area.

Each of the individual runways is associated with only one taxiway 30 with this taxiway leading only to the inner or adjacent ends of the runway. There is no taxiway leading to the remote ends of the runways.

With the wind from the southwest as indicated by the arrow 38 in FIG. 1, the runways 20, 21 and 22 can be used simultaneously as arrival or landing runways with a minimum of crosswind component. Incoming traffic may be assigned to land on these runways only with regard to proper spacing with respect to the aircraft ahead. The landed aircraft will roll to the end of the runway and turn off on the associated high-speed taxiway 30 to the ramp area 10. Suitably displaced threshold markings, such as indicated at 40 on runway 22, may be used to indicate to light aircraft a terminal landing zone of 4,000 feet, for example, to prevent delays due to the aircraft remaining on the runway for an extended period of time.

With the wind conditions as illustrated, takeoffs may be provided simultaneously on each of the runways 23, 24 and 25, again with the same crosswind component as for the landing aircraft. Each of the adjacent ends 26 of the runways may thus be provided with an enlarged ramp area 43 onto which an aircraft may move for preflight check and run up, while clearing the taxiway 30. Takeoffs may be authorized from the departure runways, as dictated by prevailing wind conditions, without regard to the aircraft landing on the arrival or landing runways. For the same reason, landing traffic may be accommodated without regard to departing aircraft using the same runways. Thus, a major obstacle to high density landing is removed by the removal of the intermix of aircraft acceleration from zero on takeoff and aircraft landing with an approach speed from 100 to 200 knots.

Air traffic control can vector incoming aircraft from outlying fixes alternately onto the several runways which are being used for landing. Under instrument conditions, of course, only the instrument runways would be used unless the minimums are above circling minimums. During VFR conditions both the instrument and noninstrument runways would be used. Even during instrument conditions the elimination of delays due to the necessity for regulating traffic in accordance with the necessity for takeoffs from the same runway surface will be substantially reduced. Further, missed approach procedures are simplified in that turns may be made away from the runways handling the outbound traffic, without undue interferences with that traffic. Emergency conditions such as abortive takeoffs, engine-out conditions and the like, may be handled with less difficulty, and the outbound runway, formed as a centerline extension of its associated inbound runway, is available in an emergency condition for landing or stopping an aircraft.

The individual runways may extend outwardly from the central region 32 into the countryside at a distance which is somewhat more than occupied by present airport systems. These runways may be likened to expressways which over a period of time, become an accepted composition of the countryside. Since no takeoffs will occur at the remote ends of any of the runways there is thus eliminated the noise and air pollution problems which exist under present conditions. Thus, there is no need for blast fences at the runway ends. Obviously, there is no need for parallel taxiways and thus the runway material may be used to best advantage. Further, since the remote ends of the runways will be used for landing aircraft only, the lighting system may be optimized with the view in mind that takeoffs will occur for any given runway in one direction only, and landing will always occur in the opposite direction.

In the airport system of this invention, aircraft always land in the general direction of the terminal and leave the runways on taxiways which have a generally uniformly short length. Not only are the runways laid out in nonintersecting relation but the taxiways do not cross any of the runways, thus reducing known collision hazards and actual risks of collision due to such crossing of taxiways. Since there is no parallel taxiways associated with the runways, there is no aircraft waiting for takeoff adjacent the touchdown of the runway. Accordingly, instrument approaches can be made under more favorable conditions, or to lower minimums, since no aircraft is waiting at or adjacent the takeoff end of the runway.

The open spaces between the runways themselves on the sides remote from the terminal area are thus unaffected by interlacing peripheral taxiways or the like, as is now common with airports. Therefore, these open spaces may be developed and used for agriculture as well as for industry. Access to these spaces may be had either directly from the outer perimeter of the airport facility or by suitable underpasses.

The arrangement of runways in centerline aligned pairs in which one runway of each pair is used exclusively for landing and the other exclusively for takeoff with any prevailing wind condition, results in an increase of safety to light aircraft by avoidance of the wake turbulence due to vortices generated by the wing tips of the aircraft. It is known for example that the severe turbulence caused by heavy aircraft is greatest during landing, prior to the time that the weight of the aircraft has transferred to its wheels. On takeoff, the turbulence is greatest after the wing has begun to support the weight of the aircraft. Therefore, in landing such turbulence can be avoided by landing long or at a point on the runway beyond that which the heavier aircraft has touched down. On takeoff, such turbulence is avoided by lifting off and climbing above the point at which the heavy aircraft has become airborne. These techniques to avoid wake turbulence are not easy to apply where there is an intermix of takeoff and landing traffic on the same runway. The present system thus permits pilots of lighter aircraft to apply wake turbulence avoidance techniques since, at any given time, a runway will be used exclusively either for takeoffs or for landings.

Figure 2:
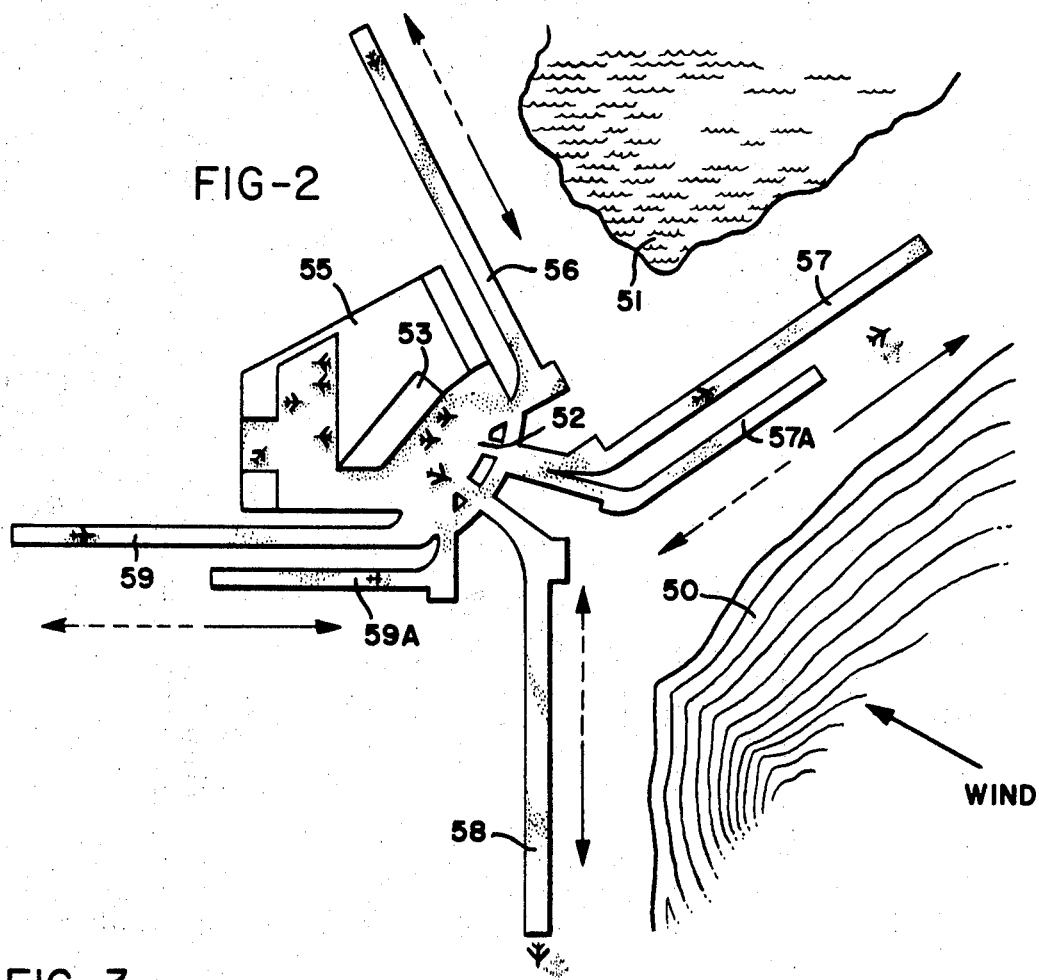
FIG. 2 is another plan diagram of an airport constructed according to a modified form of my invention.

The runway pairs of the airport system of my invention need not be positioned in precise centerline alignment with each other, but may be angularly disposed as shown in the diagram of FIG. 2. In FIG. 2 I have shown the employment of my system to accommodate the presence of a terrain feature such as the hill 50 or the body of water 51. In FIG. 2 the ramp 52 is positioned on the front side of the terminal 53, and parking 55 is available behind the terminal 53 in the conventional manner. The runways comprise runway pairs 56, 58; 57, 59; and 57a, 59a, These runway pairs are in substantial centerline alignment but not in true geometric alignment due to the expediency of avoiding a terrain obstacle. Further, the layout of FIG. 2 shows the employment of VFR runways 57a and 59a which are arranged in parallel with major instrument runways 57 and 59.

Figure 3:
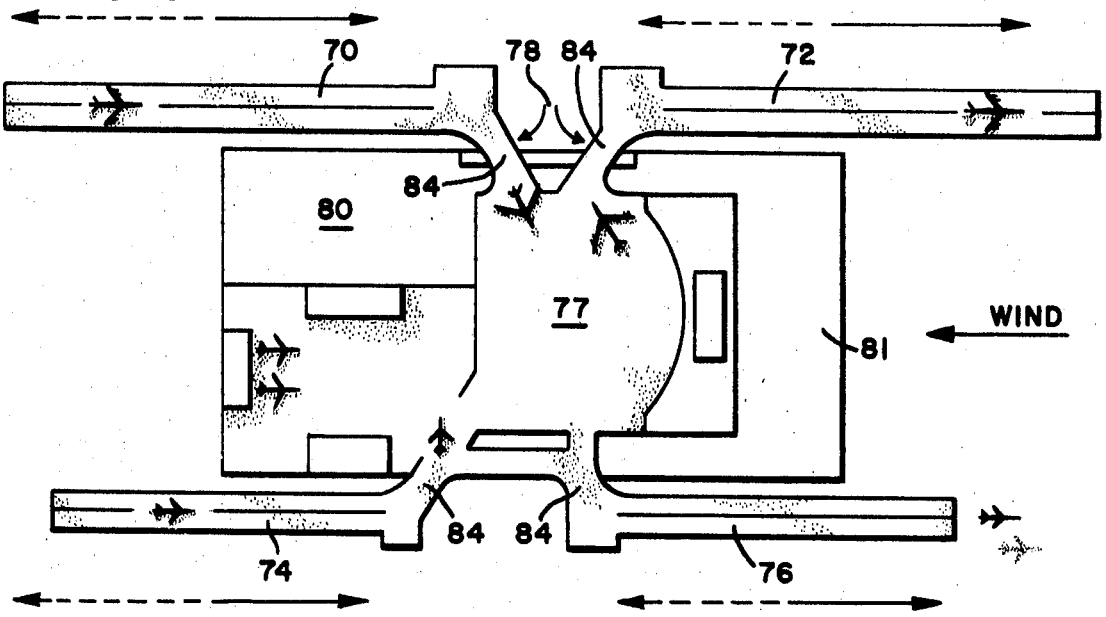
FIG. 3 is another plan diagram of a further modified form of my invention.

In many instances it may be desirable to employ a parallel runway system which extends only in one direction or to adapt such parallel runway systems to my design. Such a system is shown in FIG. 3 in which runways 70 and 72 form a centerline aligned pair and are parallel with somewhat shorter runways 74 and 76, positioned at the opposite side of a centrally disposed ramp area 77. Suitable road way underpasses may be formed at 78 leading to the terminal and to the parking areas 80 and 81. The airport system shown in FIG. 3 embodies most of the advantages of the system of FIG. 1 except that of providing more optimum runway alignment for varying wind conditions. However, the system of FIG. 3 may be suitable where there is a high predominance of prevailing wind conditions, from a given direction. If in the case of the other embodiments, the runway pairs are formed with adjacent and remote ends with adjacent ends being provided with short high-speed taxiways 84 leading to the ramp area 77.

Figure 4A:
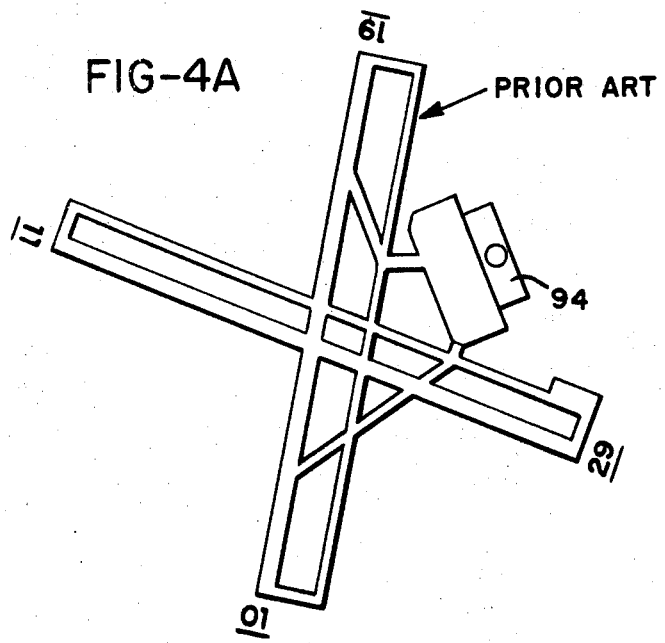
FIG. 4A is a diagram of a typical airport constructed according to the prior art.

One of the important advantages of my system is that it lends itself well to the conversion of existing facilities. In FIG. 4A I have shown a diagram of a typical runway according to present practice. It will be seen by examining FIG. 4A that there are two intersecting runways, namely runways "1—19" and runways "11—29." For each runway there is a corresponding parallel taxiway which intersect each other and one of the runways.

Figure 4B:
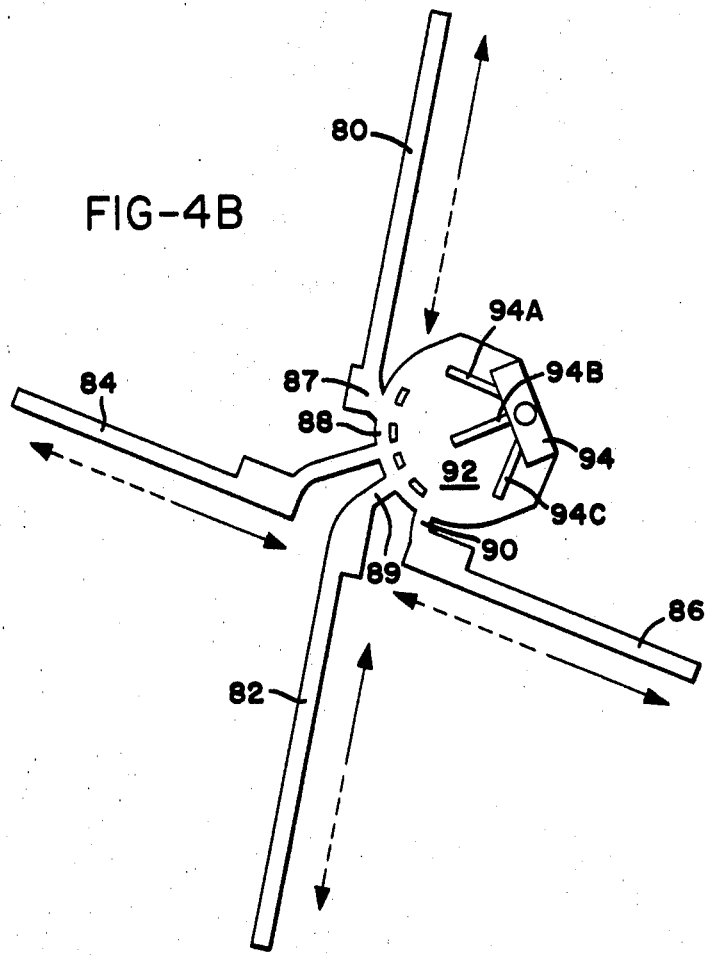
FIG. 4B shows the airport of FIG. 4A modified in accordance with my invention.

In FIG. 4B I have shown one manner in which the field of FIG. 4A can be modified according to my invention to provide a diverse system of runways in which there are no intersecting runways, (1) by suitably lengthening the existing runways "1-—19" and "11—29" and (2) by dividing these each into two separate centerline-aligned runways 80, 82 and 84,86. High-speed turnoffs and taxiways 87, 88, 89 and 96 have adjacent inner ends leading onto an expanded ramp area 92 in front of the existing terminal building 94. The expanded ramp area 92 permits the construction of terminal fingers 94A, 94B and 94C for the boarding and loading of aircraft. The existing parallel taxiways, if convenient, may be retained as access roadways for maintenance and emergency vehicles, but in the interests of clarity, they are not shown in FIG. 4B.

The conversion of the airport of FIG. 4A to my system as shown in FIG. 4B could be accomplished in the order of cost probably less than that which would be required to provide a parallel runway to one of the existing instrument runways, and would provide a substantial gain in the ability of the airport to handle travel as compared with that of merely adding a long parallel runway. Even when such parallel runway is added, the same traffic problems which are presently being encountered are built into the system, and in time the advantages in airport capacity which are obtained by the addition of such a runway are, in time, lost or substantially dissipated.

As shown in FIG. 4B four independent nonintersecting runways are now provided, utilizing substantial portions of the existing facilities. These runways all terminate adjacent the terminal area but in spaced relation to each other. Common landing and navigation aids may be employed for front and back courses, as presently provided for single runways. With any prevailing wind condition two of the runways may be employed exclusively for landing and the other two of the runways may be employed exclusively for takeoff, thus providing in effect the capacity of four parallel runways.

It will therefore be seen that the landing system of the present invention provides means by which an air traffic control may be simplified while, at the same time, a greater number of landings and takeoffs accommodated, with an improved safety factor. While the forms of apparatus herein described constitute preferred embodiments of the invention, it is to be understood that the invention is not limited to these precise forms of apparatus, and that changes may be made therein without departing from the scope of the invention.

I claim:

1. An airport comprising a terminal ramp area, a plurality of generally straight individual runways at least two of which are arranged in substantial centerline alignment and in nonintersecting relation to each other permitting employment of common instrument landing system facilities therewith, with the adjacent ends of said two runways being spaced apart and being laterally positioned at one side of said ramp area, and means defining a separate combined high speed exit and entry taxiway for each said runway, each said taxiway leading from said ramp area to one of said runways adjacent ends so that while one of said two runways is being used for landings by aircraft turning off at said adjacent end thereof onto its associated said taxiway the other of said runways may be used simultaneously for takeoffs by aircraft taxiing from said ramp area by the other of said taxiways to said other runway's adjacent end.

2. The airport of claim 1 in which said terminal ramp area is formed with a generally circular concourse with said taxiways opening into the periphery of said concourse.

3. The airport of claim 1 in which said runways extend in singular relation outwardly from said ramp area and are devoid of taxiways leading to the remote ends thereof.

4. A high density airport adapted to provide an optimum of separation between landing and departing aircraft and permitting maximum utilization of the runways, comprising at least two landing runways and at least two departure runways with one each of said departure runways being positioned in substantial centerline alignment with a different one of said landing runways and in centerline space apart relation thereto, said runways being positioned in nonintersecting relation with each other, a terminal area laterally offset with respect to said runways, and separate and independent taxiways leading from the adjacent ends of said landing and departure runways to said terminal area in nonintersecting relationship providing for simultaneous landings on said landing runways for turn off at the ends thereof onto said taxiways without delay or concern for aircraft taxiing to, or departing on, said departure runways.

5. An airport comprising a terminal ramp area, a plurality of separate runways each having adjacent ends positioned near said ramp area, and having remote ends with pairs of said runways extending from positions adjacent said ramp area outwardly therefrom in opposite directions and in spaced relation to adjacent said pairs of runways and in nonintersecting relation to any other runway with each of said runway pairs being laterally offset to the side from the center of said ramp area, and taxiways leading only from said ramp area to said runway adjacent ends.

6. The airport of claim 5 in which an open space is defined between the adjacent ends of each of said runway pairs.

7. The airport of claim 6 in which electronic landing and navigation aids are positioned in said open space.